US009329655B2

(12) United States Patent
Por et al.

(10) Patent No.: US 9,329,655 B2
(45) Date of Patent: May 3, 2016

(54) POWER MANAGEMENT FOR DATA PORTS

(71) Applicant: Intel Corporation, Santa Clara, CA (US)

(72) Inventors: Choon Gun Por, Georgetown (MY); Mun Fook Leong, Bukit Mertajam (MY)

(73) Assignee: INTEL CORPORATION, Santa Clara, CA (US)

(*) Notice: Subject to any disclaimer, the term of this patent is extended or adjusted under 35 U.S.C. 154(b) by 234 days.

(21) Appl. No.: 14/126,612

(22) PCT Filed: Dec. 13, 2012

(86) PCT No.: PCT/US2012/069405
§ 371 (c)(1),
(2) Date: Dec. 16, 2013

(87) PCT Pub. No.: WO2013/101479
PCT Pub. Date: Jul. 4, 2013

(65) Prior Publication Data
US 2014/0304530 A1   Oct. 9, 2014

(30) Foreign Application Priority Data

Dec. 28, 2011   (MY) .................... PI 20110063425

(51) Int. Cl.
*G06F 1/32*   (2006.01)
*G06F 1/26*   (2006.01)
*G06F 13/40*   (2006.01)

(52) U.S. Cl.
CPC .............. *G06F 1/266* (2013.01); *G06F 1/3278* (2013.01); *G06F 13/4072* (2013.01); *Y02B 60/126* (2013.01); *Y02B 60/1235* (2013.01)

(58) Field of Classification Search
None
See application file for complete search history.

(56) References Cited

U.S. PATENT DOCUMENTS

| 6,516,418 B1* | 2/2003 | Lee ...................... G06F 1/3203 713/320 |
| 7,449,919 B2 | 11/2008 | Lee et al. |
| 7,702,825 B2 | 4/2010 | Howard |
| 2001/0021981 A1 | 9/2001 | Konaka et al. |
| 2002/0091956 A1 | 7/2002 | Potter et al. |

(Continued)

FOREIGN PATENT DOCUMENTS

KR   20000053365 A   8/2000

OTHER PUBLICATIONS

"PCT Notification of Transmittal of the International Search Report and the Written Opinion of the International Searching Authority, or the Declaration", dated Mar. 4, 2013, for International Application No. PCT/US2012/069405, 11pgs.

(Continued)

*Primary Examiner* — Paul Yanchus, III
(74) *Attorney, Agent, or Firm* — Buckley, Maschoff & Talwalkar LLC

(57) ABSTRACT

According to some embodiments, a communication interface 110 may include a biasing circuit 140 and a logic unit 130. The biasing circuit 140 may be configured to provide a bias voltage to a port of the communication interface 110. The logic unit 130 may be configured to enable and disable the biasing circuit 140 based on a first signal received from a controller of the communication interface 110. The logic unit 130 may also be configured to enable and disable the biasing circuit 140 based on a suspend signal received from the controller of the communication interface 110.

24 Claims, 7 Drawing Sheets

(56) References Cited

U.S. PATENT DOCUMENTS

| | | |
|---|---|---|
| 2004/0122985 A1 | 6/2004 | Parra et al. |
| 2005/0138239 A1 | 6/2005 | Kasahara |
| 2006/0053318 A1 | 3/2006 | One |
| 2006/0075271 A1 | 4/2006 | Lilja et al. |
| 2008/0301339 A1* | 12/2008 | Musarra .......... G06F 13/385 710/61 |
| 2011/0268198 A1 | 11/2011 | Nishioka et al. |

OTHER PUBLICATIONS

"Communication re Supplementary European Search Report" dated Jul. 28, 2015, issued by the European Patent Office in EP Application No. 12861324.7, 10 pages.

"Notification Concerning Transmittal of International Preliminary Report on Patentability Chapter 1 of the Patent Cooperation Treaty", Jul. 10, 2014, for International Application No. PCT/US2012/069405, 8pgs.

* cited by examiner

POWER MANAGEMENT FOR DATA PORTS

BACKGROUND

With more electronic devices relying on battery power, power consumption is becoming a more important criterion in the design of electronic devices and peripheral devices that connect to electronic devices. One area that consumes power in electronic devices is communication interfaces, such as a Universal Serial Bus (USB), serial, and parallel interface. These interfaces may require periodic communications between a peripheral device and a host device. In some instances, the driving and receiving circuitry of a host device and/or peripheral device may be constantly powered simply to carry out these periodic communications and other data transfers.

DETAILED DESCRIPTION

Figure 1:
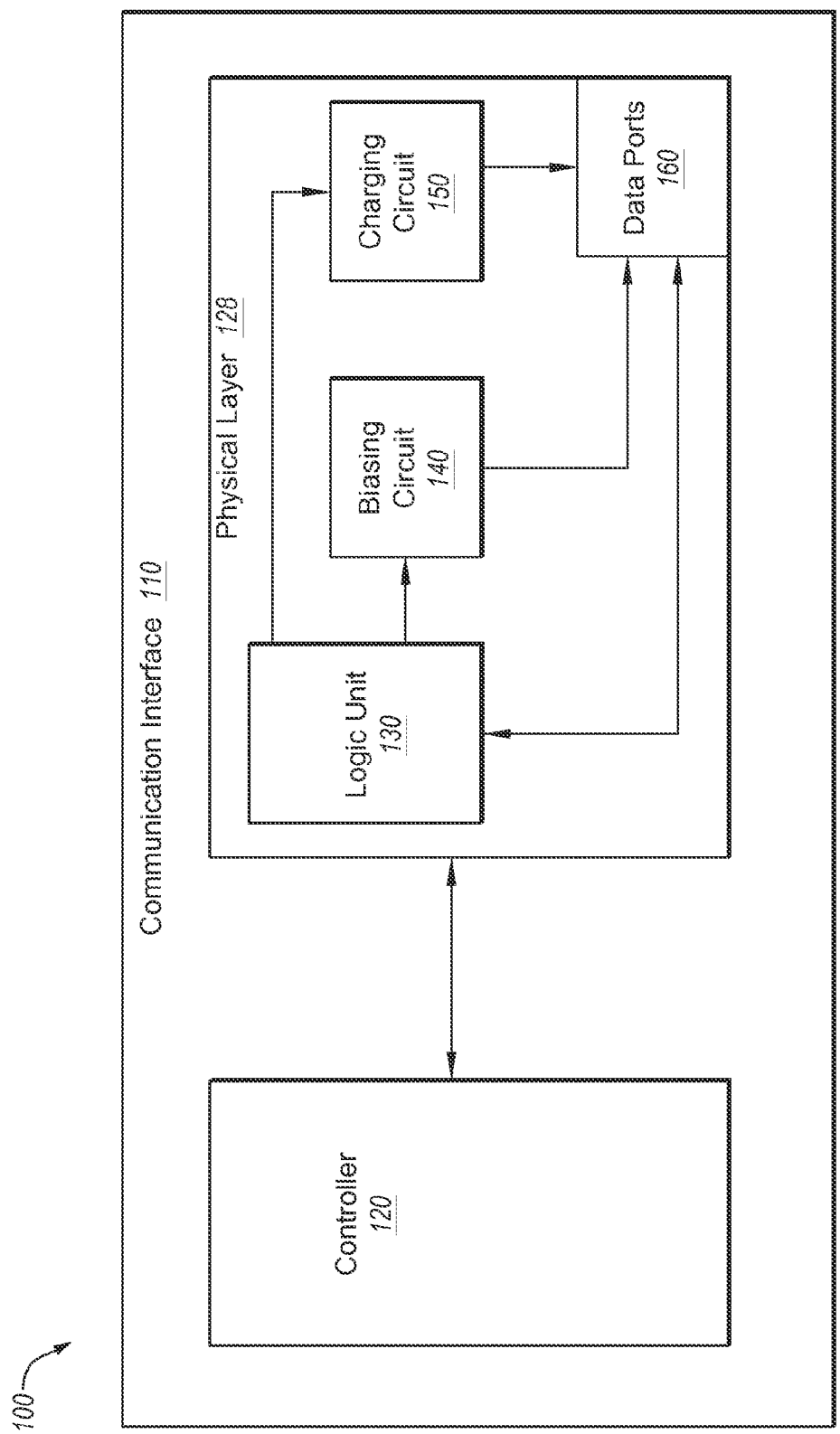
FIG. 1 is a block diagram of an example system, according to some embodiments.

FIG. 1 is a block diagram of an example system 100, according to some embodiments. The system 100 includes a communication interface 110. The communication interface 110 may be part of a serial interface, parallel interface, or a universal serial bus (USB) interface. In some embodiments, the communication interface 110 may be part of a peripheral device or part of a host device. For example, the communication interface 110 may be part of a peripheral device, such as, a mouse, keyboard, memory device, printer, or other device that connects to a computing unit. The communication interface 110 may also be part of a host device, such as a desktop or laptop computer, smart phone, tablet, PDA, or other computing device. In some embodiments, the communication interface 110 may be part of an electronic device that is able to function as either a peripheral device or a host device.

The communication interface 110 includes a physical layer 128 that includes data ports 160 for transmitting and receiving data. The communication interface 110 may further include a controller 120 that is coupled to the physical layer 128. The physical layer 128 may be configured to receive signals from the controller 120 and, based on those signals, enable and disable a biasing voltage and/or current supplied to the data ports 160. In particular, the physical layer 128 may enable and disable the biasing voltage and/or current supplied to the data ports 160 based on a received suspend signal or first signal. By allowing the physical layer 128 to enable and disable the biasing voltage and/or current, the power consumption of the physical layer 128 may be reduced. As a result, the power consumption of the communication interface 110 may also be reduced.

Referring again to FIG. 1, in an example embodiment, the physical layer 128 includes a logic unit 130 that receives the first signal and the suspend signal from the controller 120. In some embodiments, the first signal may be a data transmit signal or some other signal received by the logic unit 130 besides the suspend signal. In some embodiments, the logic unit 130 may receive additional signals from the controller 120, such as a clk, data signals, and other control signals. Alternately or additionally, the logic unit 130 may send signals to the controller 120.

The physical layer 128 further includes, but is not limited to, a biasing circuit 140 and a charging circuit 150. The biasing circuit 140 is coupled to the logic unit 130 and may be configured to provide a biasing voltage and/or current to the data ports 160 based on one or more signals received from the logic unit 130. The charging circuit 150 is also coupled to the logic unit 130 and may be configured to provide a charging voltage and/or current to the data ports 160 based on one or more signals received from the logic unit 130. In some embodiments, the charging circuit 150 may provide the charging voltage and/or current to reduce the time to drive the voltage and/or current of the data ports 160 to a predetermined level.

Based on the suspend signal or the first signal, the logic unit 130 may be configured to enable the biasing circuit 140, to cause the biasing circuit 140, to provide a bias voltage and/or current to one or more of the data ports 160, to allow the one or more data ports 160 to operate correctly. The logic unit 130 may further be configured to disable the biasing circuit 140, based on the suspend signal or the first signal, or to cause the biasing circuit 140 to stop providing a bias voltage and/or current to the one or more data ports 160. Thus, the logic unit 130 may enable or disable the data ports 160 by way of the biasing circuit 140. By eliminating the bias voltage and/or current to one or more of the data ports 160, the power consumption of the physical layer 128 may be reduced as compared to the power consumption of the physical layer 128 if the bias voltage and/or current was not eliminated.

Based on the suspend signal or the first signal, in some embodiments, the logic unit 130 may also be configured to enable the charging circuit 150 to cause the charging circuit 150 to provide a charging voltage and/or current to one or more of the data ports 160. In particular, the charging circuit 150 may provide a charging voltage and/or current to one or more of the data ports 160 when the biasing circuit 140 initially applies a bias voltage and/or current. Apply the charging current may provide an initial "boost" or "kick" of voltage and/or current to the one or more data ports 160 to reduce the time to bring the bias voltage and/or current of the one or more data ports 160 to an operating threshold level. Thus, using the charging voltage and/or current from the charging circuit 150, the time to settle the bias voltage and/or current of the one or more data ports 160 at an operating threshold level may be reduced. Once the bias voltage and/or current of the one or more data ports 160 is brought to the operating threshold level, the biasing circuit 140 alone may be able to provide sufficient voltage and/or current to maintain the bias voltage and/or current of the one or more data ports 160 at the operating threshold level.

In some embodiments, the logic unit 130 may also be configured to disable the charging circuit 150, to cause the charging circuit 150 to stop providing a charging voltage and/or current to the one or more data ports 160 after a predetermined time period, and/or after the voltage and/or current level of the one or more data ports 160 is brought to the operating threshold level.

Note that the logic unit 130 may enable or disable the biasing circuit 140 based on the suspend signal or the first signal received from the controller 120. In some embodiments, the controller 120 may receive an instruction to place the communication interface 110 into a suspend mode or a low power mode from external hardware and/or software, such as hardware or software in an external electronic device that utilizes the communication interface 110 to communicate. Alternately or additionally, the controller 120 may make a determination based on one or more factors to place the communication interface 110 into a suspend mode or a low power mode. For example, the controller 120 may place the communication interface 110 into a suspend mode when it does not sense the connection of a communication bus between the communication interface 110 and another electronic device. In these and other embodiments, the controller 120 may assert a suspend signal. After receiving the asserted suspend signal, the logic unit 130 may disable the biasing circuit 140 to eliminate the biasing voltage and/or current to one or more of the data ports 160.

The controller 120 may deassert the suspend signal based on a resume signal from external hardware and/or software, or based on a self-initiated resume sequence. After receiving the deasserted suspend signal, the logic unit 130 may enable the biasing circuit 140 to provide a biasing voltage and/or current to one or more of the data ports 160. In these embodiments, the controller 120 and external hardware and/or software may be aware that the biasing circuit 140 is disabled.

The logic unit 130 may also enable or disable the biasing circuit 140 based on the first signal received from the controller 120. The first signal may be asserted or deasserted by the controller 120 to indicate some condition exists besides the suspend condition discussed above. Based on this signal, the logic unit 120 may enable or disable the biasing circuit 140 and thereby enable or disable the data ports 160 without the logic of the controller 120 or other external hardware and/or software that interfaces with the communication interface 110 being aware that the data ports 160 are being enabled and disabled. Thus, the physical layer 128 of the communication interface 110 may enable and disable the data ports 160 independently to reduce the power consumption of the communication interface 110.

Various different configurations of the physical layer 128 may be implemented in different embodiments. For example, in some embodiments, the logic unit 130, biasing circuit 140, charging circuit 150, and the data ports 160 may all be implemented in hardware, programmable devices, or some combination thereof. Alternately or additionally, the biasing circuit 140 and the charging circuit 150 may be implemented in separate circuits as illustrated, or may be combined into a single circuit. Alternately or additionally, the data ports 160 may include a differential transmitter, receiver, and envelope detector, or some combination thereof. Alternately or additionally, the data ports 160 may include a non-differential transmitter, a non-differential receiver, or both.

Alternately or additionally, the logic unit 130 may receive just the suspend signal and the first signal from the controller 120 and be configured to enable and disable the biasing circuit 140 accordingly. Alternately or additionally, the logic unit 130 may receive just the first signal from the controller 120 and another circuit may receive the suspend signal from the controller 120. In these and other embodiments, the physical layer 128 may include an additional logic unit to send and receive data through the data ports 160 and/or perform additional operations, such as enabling and disabling the biasing circuit 140 based on a suspend signal. Alternately or additionally, the communications between the controller 120 and the logic unit 130 may adhere to a Transceiver Macrocell Interface (UTMI) or UTMI+ protocol. For example, in some embodiments, the logic unit 130 or another module within the physical layer 128 may be configured to perform operations to adhere to UTMI or UTMI+ protocol. Alternately or additionally, the communications between the controller 120 and the logic unit 130 may be accomplished by some means other than asserting and deasserting signals.

Figure 2:
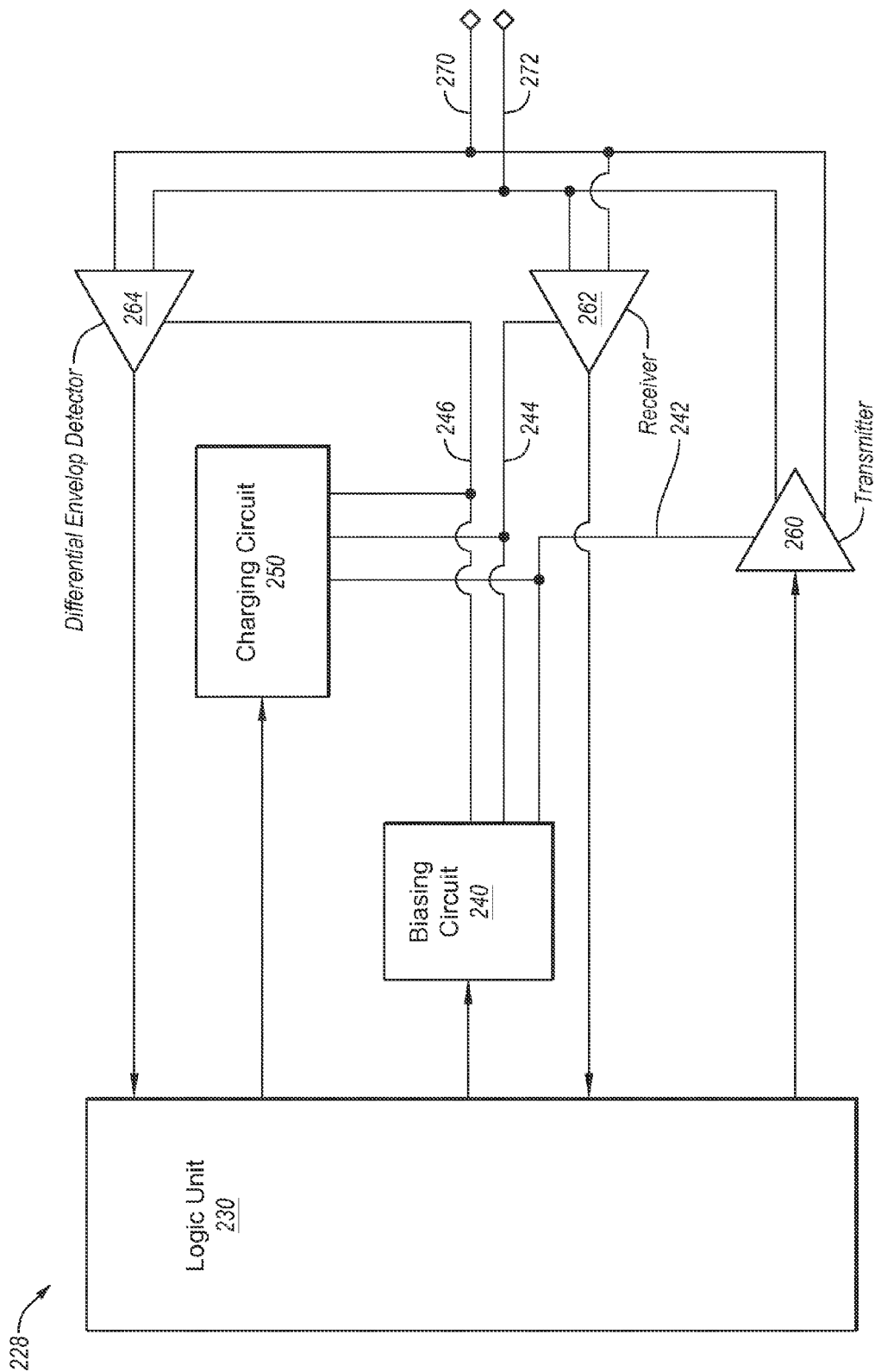
FIG. 2 is a block diagram of an example physical layer, according to some embodiments.

FIG. 2 is a block diagram of an example physical layer 228 according to some embodiments. The physical layer 228 includes a logic unit 230, biasing circuit 240, charging circuit 250, transmitter 260, receiver 262, differential envelope detector 264, and differential data lines 270, 272.

The logic unit 230 is coupled to and communicates with the biasing circuit 240 and the charging circuit 250. The logic unit 230 is also coupled to the transmitter 260, receiver 262, and the differential envelope detector 264. The logic unit 230 may send data to the transmitter 260 to transmit the data over the differential data lines 270, 272. The logic unit 230 may also receive data from the differential data lines 270, 272 through the receiver 262 and a squelch signal from the differential envelope detector 264.

The biasing circuit 240, and the charging circuit 250, are coupled to the transmitter 260, receiver 262, and the differential envelope detector 264 by respective first, second, and third voltage lines 242, 244, 246. Based on a signal from the logic unit 230, the biasing circuit 240, and the charging circuit 250, may individually provide a respective bias voltage and charging voltage to each of the transmitter 260, receiver 262, and the differential envelope detector 264.

An example of enabling and disabling the biasing circuit 240 and the charging circuit 250 follows. In some embodiments, a first signal received by the logic unit 230, which is not a suspend signal, that causes the logic unit 230 to enable the biasing circuit 240 and the charging circuit 250 may be a data transmit signal. The data transmit signal, when asserted, may indicate to the logic unit 230 that data is available to transmit over the differential data lines 270, 272 using the transmitter 260.

In some embodiments, the biasing circuit 240 and charging circuit 250, may default to a disabled condition or state. After the data transmit signal is asserted, the logic unit 230 may assert a transmit bias signal to enable the biasing circuit 240, to cause the biasing circuit 240, to provide a bias voltage to the transmitter 260 over the first voltage line 242. The logic unit 230 may also assert a transmit charging signal to enable the charging circuit 250, to cause the charging circuit 250, to provide a charging circuit to the transmitter 260 over the first voltage line 242. In some embodiments, no voltage may be provided on the second and third voltage lines 244, 246 when the data transmit signal is asserted.

After the bias voltage on the first voltage line 242 reaches an operating threshold level, the logic unit 230 may deassert the transmit charging signal to disable the charging circuit 250. In some embodiments, disabling the charging circuit 250 may reduce the power consumption of the communication interface 110. In some embodiments, the logic unit 230 may sense the voltage level on the first voltage line 242 to determine when the operating threshold level is reached or may wait a period sufficient to allow the voltage to reach the operating threshold level. In some embodiments, using the charging circuit 250 to reduce the time for the bias voltage of the transmitter 260 to reach an operating threshold may reduce the likelihood of the logic unit 230 throttling transmit data while waiting for the operating threshold level of the transmitter 260 to be reached. By reducing the likelihood of the logic unit 230 throttling transmit data, the transmit data throughput of the physical layer 228 may be maintained.

The transmitter 260 may then be enabled to transmit the data provided by the logic unit 230. When the data transmit signal is deasserted, the logic unit 230 may deassert the transmit bias signal to disable the biasing circuit 240 and thereby disable the transmitter 260. Following the above actions, the transmitter 260 may be supplied a bias voltage when data is available to transmit over the differential data lines 270, 272. Thus, the power consumption of the physical layer 228 may be reduced as compared to a physical layer that supplies a bias voltage to a transmitter when the transmitter is not transmitting data.

When the data transmit signal is deasserted, in some embodiments, the logic unit 230 may assert a receiver bias signal to enable the biasing circuit 240 and assert a receiver charging signal to enable the charging circuit 250. Enabling the biasing circuit 240 causes the biasing circuit 240 to provide a bias voltage to the receiver 262 and the differential envelope detector 264 over the second and third voltage lines 244, 246. Enabling the charging circuit 250, causes the charging circuit to provide a charging voltage to the receiver 262 and the differential envelope detector 264, over the second and third voltage lines 244, 246.

After the bias voltage on the second and third voltage lines 244, 246 reaches an operating threshold level, the logic unit 230 may deassert the receiver charging signal to disable the charging circuit 250. In some embodiments, disabling the charging circuit 250 may reduce the power consumption of the communication interface 110. The receiver 262 and the differential envelope detector 264 may then be enabled to receive data provided over the differential data lines 270, 272. After a predetermined period, the logic unit 230 may deassert the receiver bias signal to disable the biasing circuit 240. Disabling the biasing circuit 240 may cause the biasing circuit 240 to stop providing a bias voltage to the receiver 262 and the differential envelope detector 264. In some embodiments, the predetermined period for which the logic unit 230 asserts the receiver bias signal may be determined based on the communication protocol being employed by the physical layer 228. For example, if the physical layer 228 is part of a USB interface of a host controller, the period may be equal to a period allowed for the host controller to receive a response from a peripheral device after sending a data packet. This period may be referred to as a timeout period.

In some embodiments, maintaining the bias voltage on the receiver 262 for the predetermined period may reduce the likelihood of missing data sent over the differential data lines 270, 272. Furthermore, in some embodiments, using the charging circuit 250 to reduce the time for the bias voltage on the receiver 262 to reach an operating threshold may reduce the likelihood of data sent over the differential data lines 270, 272 being missed, while waiting for the bias voltage to reach the operating threshold to fully enable the receiver 262.

In some embodiments, the bias voltage for the receiver 262 and the differential envelope detector 264 may remain enabled regardless of the status of the first signal and may be disabled after the suspend signal is received by the logic unit 230. For example, if the physical layer 228 is part of a USB interface of a device controller, the device controller may not know when a data packet will be sent from the host controller. As a result, the bias voltage for the receiver 262 and the differential envelope detector 264 of the device controller may not be disabled so that the device controller does not miss a data packet from the host controller.

Various different configurations of the physical layer 228 may be implemented in different embodiments. For example, in some embodiments, the logic unit 230, biasing circuit 240, and the charging circuit 250 may all be implemented in hardware, programmable devices, or some combination thereof. Alternately or additionally, the biasing circuit 240 and the charging circuit 250 may be implemented in separate circuits as illustrated or may be combined into a single circuit. Alternately or additionally, the physical layer 228 may include a non-differential transmitter and a non-differential receiver. Alternately or additionally, the logic unit 230 may not receive data from and/or send data to the differential data lines 270, 272. In these and other embodiments, the logic unit 230 may operate to enable and disable the biasing circuit 240 and the charging circuit 250. An additional circuit or logic unit may receive data from and/or send data to the differential data lines 270, 272.

Figure 3A:
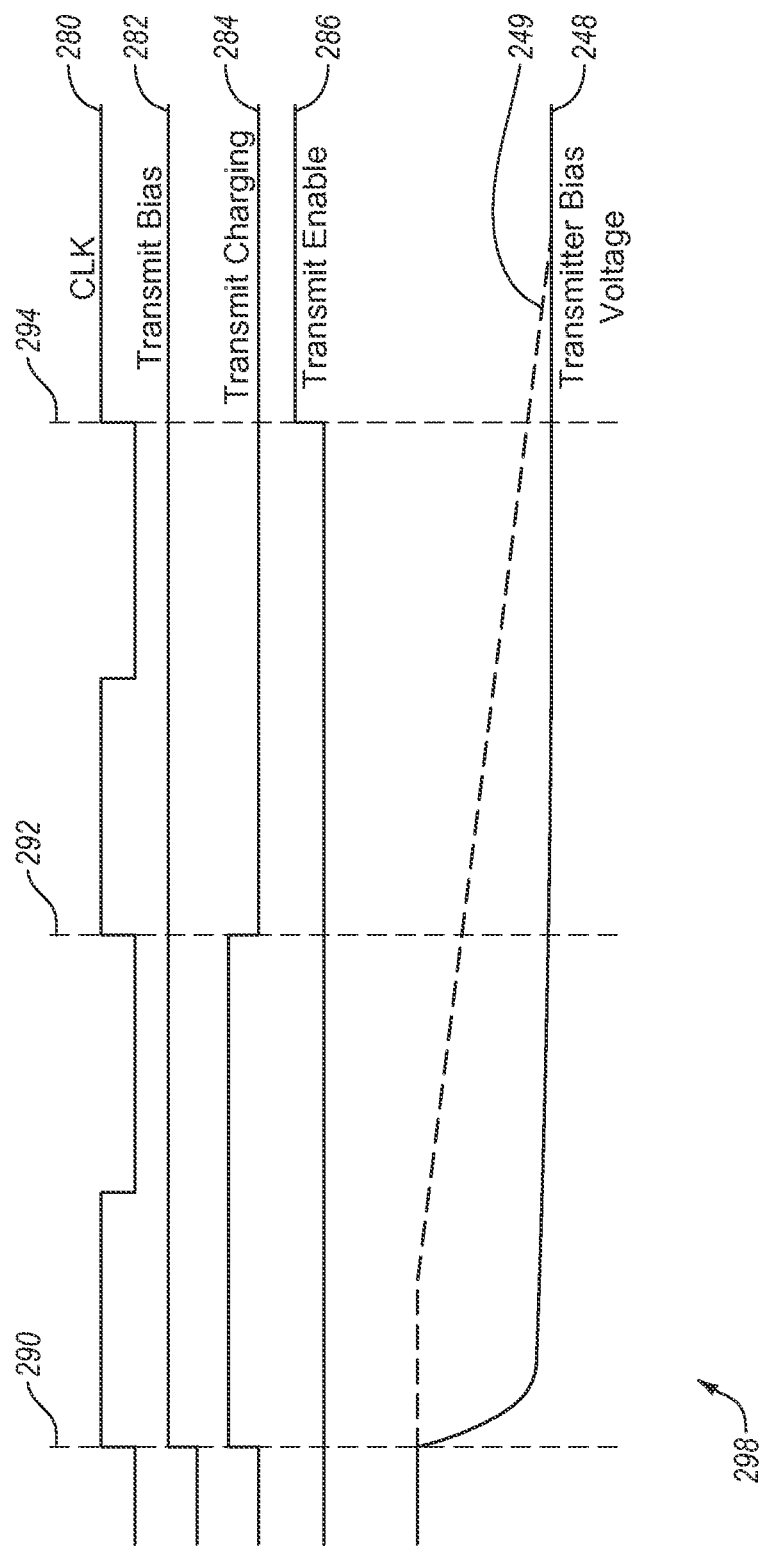
FIG. 3 illustrates an example timing diagram of various signals in an example physical layer, according to some embodiments.

FIG. 3A illustrates an example timing diagram 298 of various signals in an example physical layer according to some embodiments. The timing diagram 298 relates to timing for enabling a transmitter, for example the transmitter 260 of FIG. 2, in a physical layer, such as the physical layer 228 of FIG. 2. The timing diagram 298 may not reflect all of the signals involved with enabling the transmitter and is provided only as an example.

The timing diagram 298 illustrates a clk 280, transmit bias signal 282, transmit charging signal 284, transmit enable signal 286, and a voltage level of a transmitter bias voltage 248 after the receipt of a first signal by a logic unit, such as the logic unit 230 of FIG. 2.

Note that the enabling and disabling of the transmitter may be done by the physical layer independent of a controller, such as the controller 120 of FIG. 1, and/or external hardware and software that interfaces with the controller. To perform the enabling and disabling of the transmitter independently, the physical layer may need to adhere to established timing protocols for transmitting data as if the transmitter was always enabled. The timing diagram 298 illustrates, in some embodiments, adherence to an example timing protocol.

The timing diagram 298 illustrates that the transmit enable signal 286 may be asserted at time 294. In some embodiments, a timing protocol may require a level of the transmitter bias voltage 248 to be established and settled when the transmit enable signal 286 is asserted. Dashed line 249 represents a voltage level of the transmitter bias voltage 248 when no charging circuit is used to drive the transmitter bias voltage 248 to a predetermined level.

To avoid complications with the voltage level of the transmitter bias voltage 248 and other timing issues, the physical layer may use a charging circuit, such as the charging circuit 250 of FIG. 2, to "boost" or "kick" the transmitter bias voltage 248 to an operating threshold level. At the rising edge of the clk 280 at time 290, the logic unit may assert the transmit bias signal 282 and the transmit charging signal 284 to enable a biasing circuit and a charging circuit respectively. At the rising edge of the clk 280 at time 292, the logic unit may deassert transmit charging signal 284. By asserting the transmit charging signal 284 at the same time as the transmit bias signal 282, the voltage level of the transmitter bias voltage 248 may be "boosted" or "kicked" to an operating threshold and stabilized before the assertion of the transmit enable signal 286. Having the transmitter bias voltage 248 settled at an operating threshold before the assertion of the transmit enable signal 286 may allow the physical layer to adhere to timing protocols with reduced impact to transmit data throughput or Quality of Service.

In some embodiments, the clk 280 may be faster or slower than indicated in the timing diagram. For example, depending on the speed of the clk 280, the transmit charging signal 284 may be asserted for more or less than one cycle of the clk 280. The transmit charging signal 284 may be asserted for a period sufficient to allow the transmitter bias voltage 248 to reach a threshold and settle before the transmit enable signal 286 is asserted. In some embodiments, the transmit bias signal 282, transmit charging signal 284, and transmit enable signal 286 may be asserted on the falling edge of the clk 280.

Figure 3B:
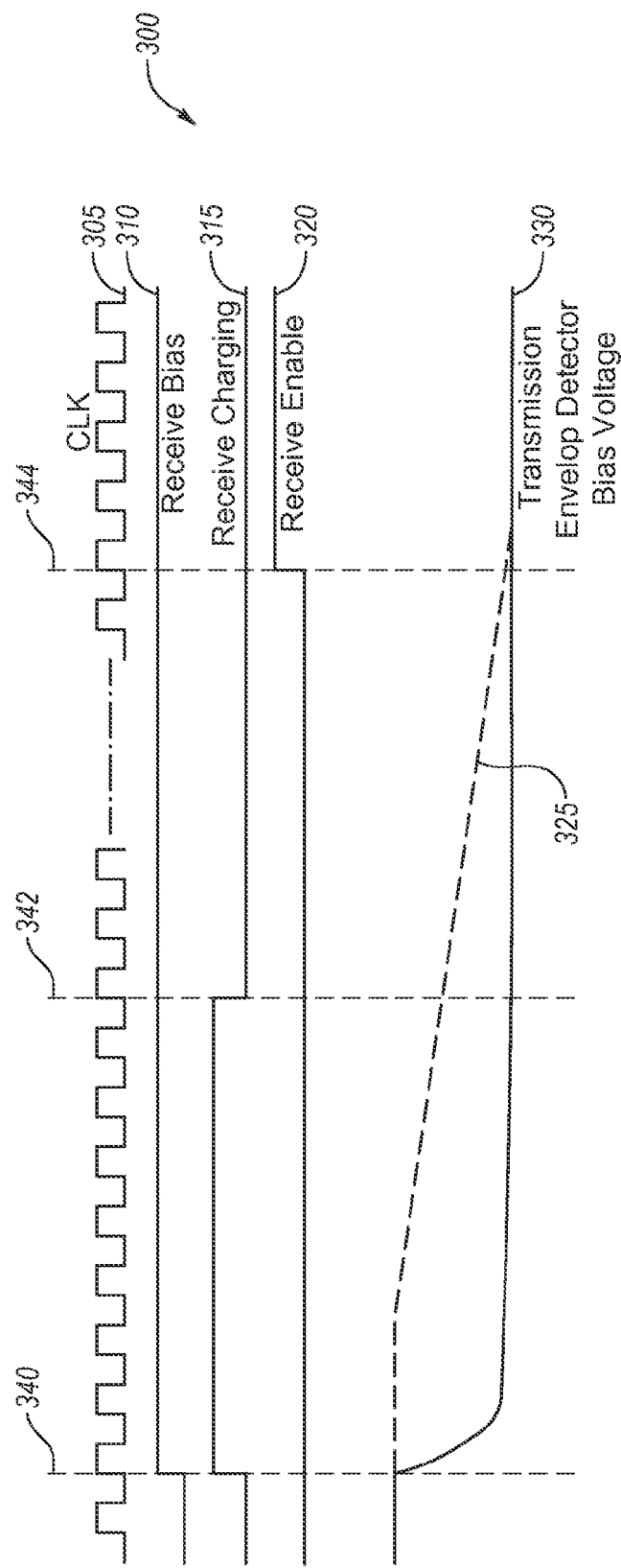

FIG. 3B illustrates an example timing diagram 300 of various signals in an example physical layer according to some embodiments. The timing diagram 300 relates to timing for enabling a receiver and/or transmission envelope detector, for example the receiver 262 and/or the transmission envelop detector 264 of FIG. 2, in a physical layer, such as the physical layer 228 of FIG. 2. The timing diagram 300 may not reflect all of the signals involved with enabling a receiver and/or transmission envelope detector and is provided only as an example.

The timing diagram 300 illustrates a clk 305, receive bias signal 310, receive charging signal 310, receive enable signal 320, and a voltage level of a transmission envelope detector bias voltage 330 after the receipt of a first signal by a logic unit, such as the logic unit 230 of FIG. 2.

Note that the enabling and disabling of the receiver and/or transmission envelope detector may be done by the physical layer independent of a controller, such as the controller 120 of FIG. 1, and/or external hardware and software that interfaces with the controller. To perform the enabling and disabling of the receiver and/or transmission envelope detector independently, the physical layer may need to adhere to established timing protocols for receiving data as if the receiver and/or transmission envelope detector was always enabled. The timing diagram 300 illustrates, in some embodiments, adherence to an example timing protocol.

The timing diagram 300 illustrates that the receive enable signal 320 may be asserted at time 344. In some embodiments, a timing protocol may require a level of the transmission envelope detector bias voltage 330 to be established and settled when the receive enable signal 320 is asserted. Dashed line 325 represents a voltage level of the transmission envelope detector bias voltage 330 when no charging circuit is used to drive the transmission envelope detector bias voltage 330 to a predetermined level.

To avoid complications with the voltage level of the transmission envelope detector bias voltage 330 and other timing issues, the physical layer may use a charging circuit, such as the charging circuit 250 of FIG. 2, to "boost" or "kick" the transmission envelope detector bias voltage 330 to an operating threshold level. At the rising edge of the clk 305 at time 340, the logic unit may assert the receive bias signal 310 and the receive charging signal 315 to enable a biasing circuit and a charging circuit respectively. At the rising edge of the clk 305 at time 342, the logic unit may deassert receive charging signal 315. By asserting the receive charging signal 315 at the same time as the receive bias signal 310, the voltage level of the transmission envelope detector bias voltage 330 may be "boosted" or "kicked" to an operating threshold and stabilized before the assertion of the receive enable signal 320. Having the transmission envelope detector bias voltage 330 settled at an operating threshold before the assertion of the receive enable signal 320, may allow the physical layer to adhere to timing protocols with reduced or no impact to receive data throughput or Quality of Service.

In some embodiments, the clk 305 may be faster or slower than indicated in the timing diagram. For example, depending on the speed of the clk 305, the receive charging signal 315 may be asserted for more or less than eight cycles of the clk 305. The receive charging signal 315 may be asserted for a period sufficient to allow the transmission envelope detector bias voltage 330 to reach a threshold and settle before the receive enable signal 320 is asserted. In some embodiments, the receive bias signal 310, receive charging signal 315 and the receive enable signal 320 may be asserted on the falling edge of the clk 305.

Figure 4:
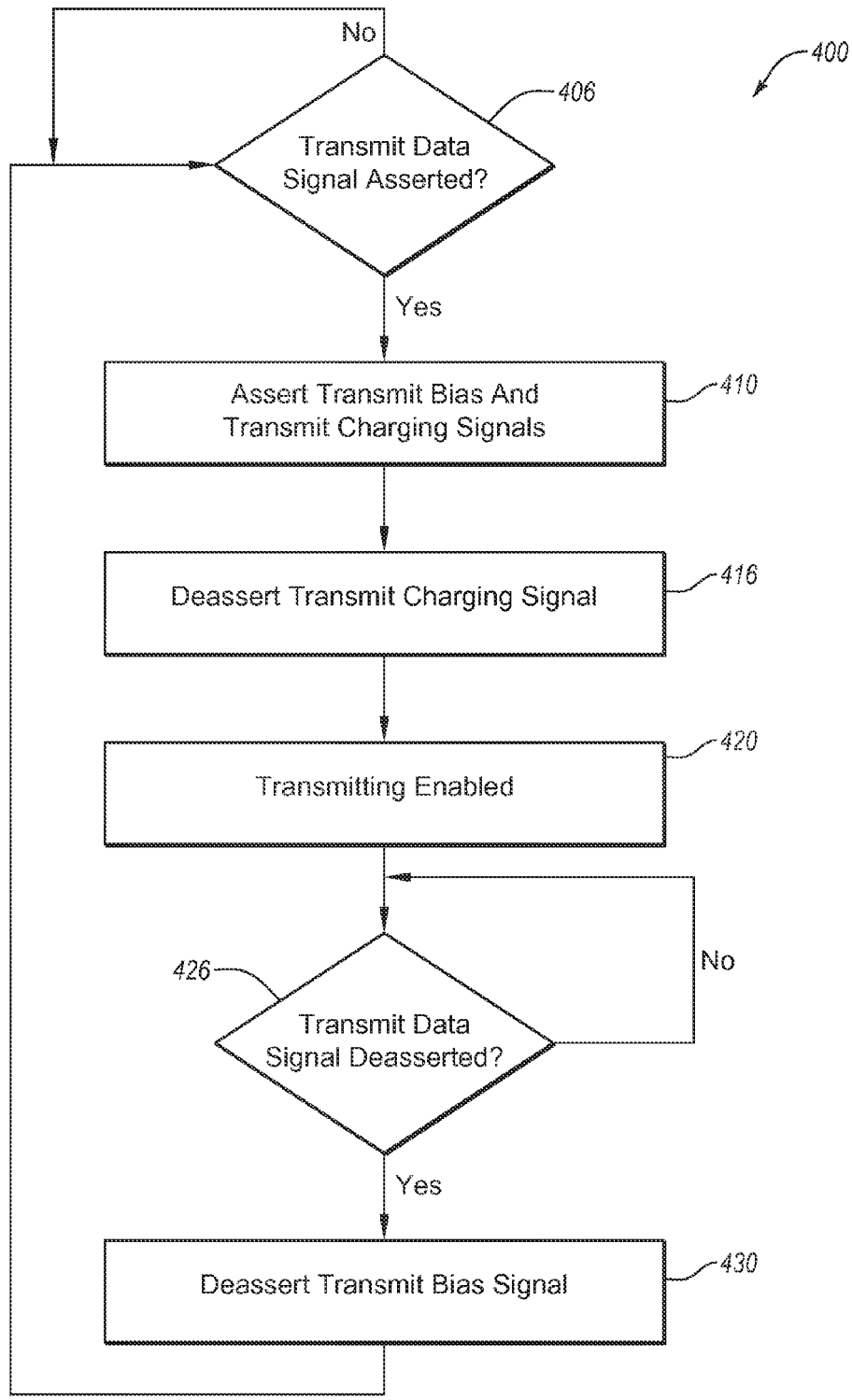
FIG. 4 illustrates a flow chart of an example method, according to some embodiments.

FIG. 4 is a flow chart of an example method 400 according to some embodiments. The method 400 may be performed, for example, by the system 100, or more particularly, by the physical layer 128 and/or 228, described with respect with FIGS. 1 and/or 2. The flow charts described herein do not necessarily imply a fixed order to the actions, and embodiments may be performed in any order that is practical. Note that any of the methods described herein may be performed by hardware, software (including microcode), or a combination of hardware and software. For example, a storage medium may store thereon instructions that when executed by a machine result in performance according to any of the embodiments described herein.

The method 400 may be used to enable and disable a bias voltage of a transmitter based on a signal level of a transmit data signal sent by a controller of a communication interface to a physical layer of the communication interface.

At 406, it may be determined if the transmit data signal is asserted. The transmit data signal, when asserted, may indicate that data is available to transmit over the transmitter of the physical layer of the communication interface. If the transmit data signal is not asserted, the method 400 may remain at 406. If the transmit data signal is asserted, the method 400 may proceed to 410.

At 410, a transmit bias signal may be asserted to enable a biasing circuit of the physical layer to provide a bias voltage to the transmitter. Providing the bias voltage may enable the transmitter to transmit data. A transmit charging signal may also be asserted to enable a charging circuit of the physical layer to provide a charging voltage to the transmitter. Providing the charging voltage may reduce the time to settle the bias voltage of the transmitter at an operating level. At 416, the transmit charging bias signal may be deasserted to disable the charging circuit and eliminate the charging voltage. The charging circuit may be disabled after the bias voltage level of the transmitter reaches a predetermined threshold. At 420, the transmission of data may be enabled and the biasing circuit may remain enabled to maintain the bias voltage on the transmitter.

At 426, it may be determined if the transmit data signal has been deasserted. The transmit data signal being deasserted may indicate that data is unavailable to transmit through the transmitter. If the transmit data signal has been deasserted, the method 400 may proceed to 430. If the transmit data signal has not been deasserted, the method 400 may remain at 426 until it is determined that the transmit data signal has been deasserted. At 430, the transmit bias signal may be deasserted to disable the biasing circuit, thereby eliminating the bias voltage provided to the transmitter. The method 400 may proceed to 406.

The method 400 may be implemented by the physical layer of the communication interface of a host device or a device controller. For example, the method 400 may be implemented by the physical layer of a host device or a device controller using a USB interface. Implementing the method 400 may reduce the power consumption of the physical layer because the bias voltage of the transmitter may be applied when the transmitter is transmitting data and not at other times.

Figure 5:
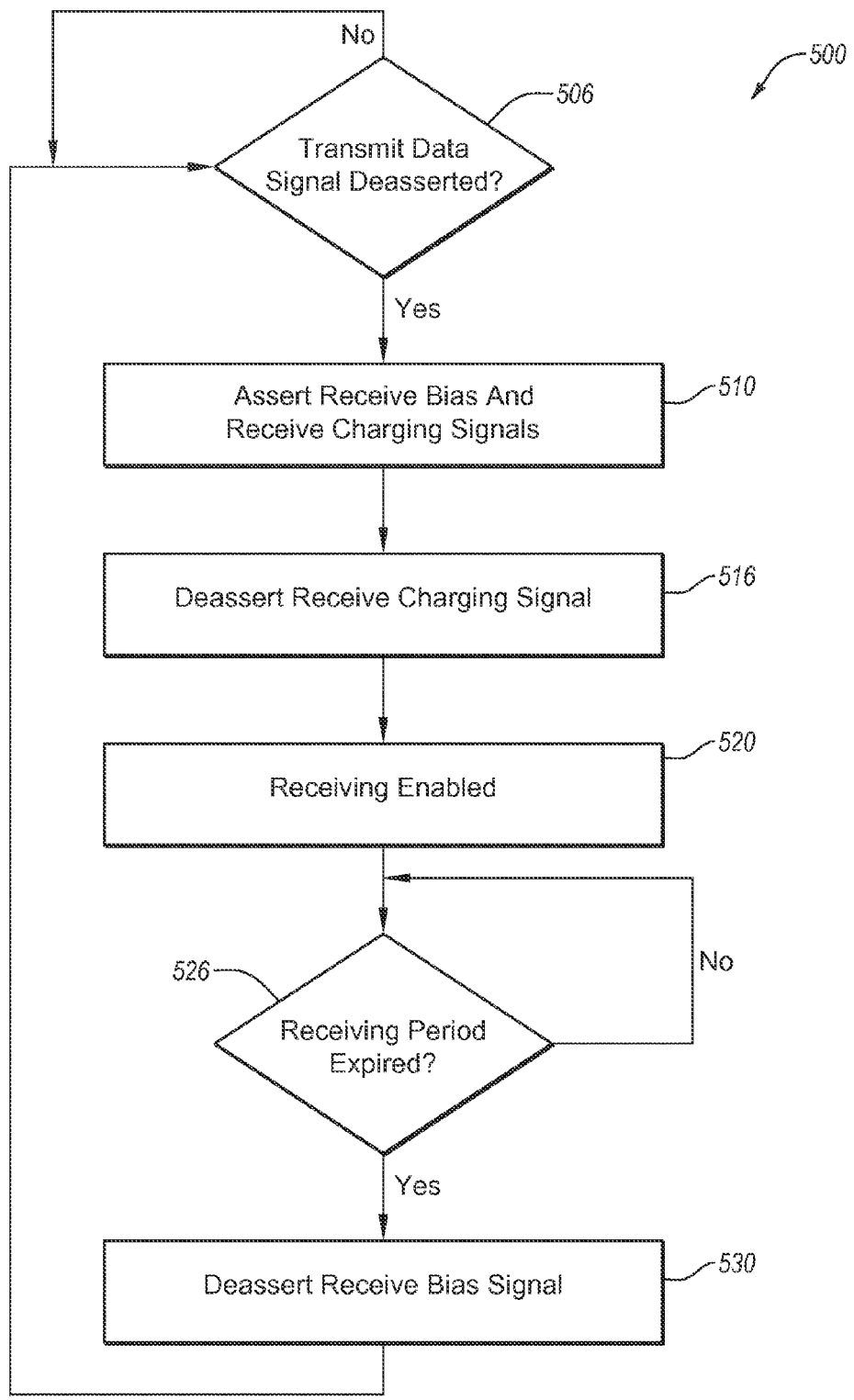
FIG. 5 illustrates a flow chart of another example method, according to some embodiments.

FIG. 5 is a flow chart of an example method 500 according to some embodiments. The method 500 may be performed, for example, by the system 100, or more particularly, by the physical layer 128 and/or 238, described with respect with FIGS. 1 and/or 2.

The method 500 may be used to enable and disable a bias voltage of a receiver based on a signal level of a transmit data signal sent by a controller of a communication interface to a physical layer of the communication interface.

At 506, it may be determined if the transmit data signal is deasserted. The transmit data signal being deasserted may indicate that data is unavailable to transmit through a transmitter of the physical layer. Alternately or additionally, the transmit data signal being deasserted may indicate that data may be received by the receiver of the physical layer of the communication interface. If the transmit data signal is not deasserted, the method 500 may remain at 506. If the transmit data signal is deasserted, the method 500 may proceed to 510.

At 510, a receive bias signal may be asserted to enable a biasing circuit of the physical layer to provide a bias voltage to the receiver. Providing the bias voltage may enable the receiver to receive data. A receive charging signal may also be asserted to enable a charging circuit of the physical layer to provide a charging voltage to the receiver. Providing the charging voltage may reduce the time to settle the bias voltage of the receiver at an operating level. At 516, the receive charging signal may be deasserted to disable the charging circuit and eliminate the charging voltage. The charging circuit may be disabled after the bias voltage level of the receiver reaches a predetermined threshold. At 520, the receiving of data may be enabled and the biasing circuit may remain enabled to maintain the bias voltage on the receiver.

At 526, it may be determined if a receiving period has expired. If the receiving period has expired, the method 500 may proceed to 530. If the receiving period has not expired, the method 500 may remain at 526 until it is determined that the receiving period has expired. At 530, the receive bias signal may be deasserted to disable the biasing circuit, thereby eliminating the bias voltage provided to the receiver. The method 500 may proceed to 506.

Implementing the method 500 may reduce the power consumption of the physical layer because the bias voltage of the receiver may be applied when the receiver receives data and not at other times. The method 500 may be implemented by the physical layer of the communication interface of a host device. For example, the method 500 may be implemented by the physical layer of a host device using a USB interface. Note that the method 500, in some embodiments, may not be implemented by a communication interface of a slave device controller because the slave device controller may have to maintain the receivers of the communication interface enabled to receive data from a host device of the device controller.

Figure 6:
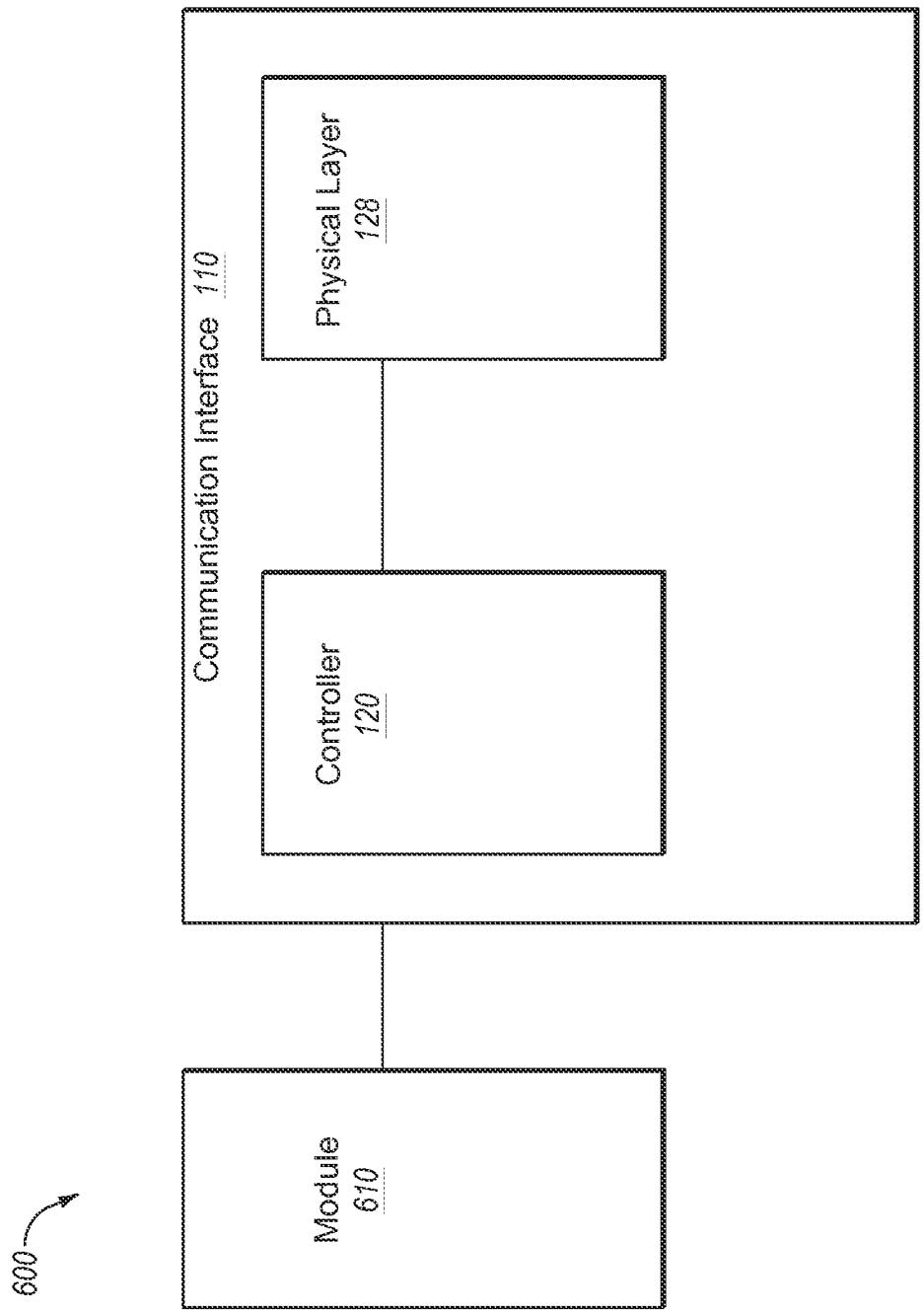
FIG. 6 is a block diagram of an example system that incorporates the example system of FIG. 1, according to some embodiments.

FIG. 6 is a block diagram of an example system 600 that incorporates the example system 100 of FIG. 1, according to some embodiments. The system 600 may include a module 610 coupled to the communication interface 110. The module 610 may be any module that sends and receives data through the communication interface 110. For example, in some embodiments, the module 610 may be the circuitry in a mouse, keyboard, memory device, gaming unit, or printer that communicates with a host device, such as a desktop, laptop, tablet, smart phone or other computing unit, through the communication interface 110. According to some embodiments, a display port may be provided (e.g., to be coupled to a display monitor). In any embodiment described herein, the communication interface 110 may be part of a USB device controller. In some embodiments, the module 610 may be a computing unit, such as, a tablet, smart phone, laptop, or desktop that communicates with a peripheral device or other computing unit through the communication interface 110. In these and other embodiments, the communication interface 110 may be part of a USB host device.

Although particular system, hardware, and interface configurations have been described herein, note that embodiments may be performed with any other types of system, hardware, and/or interface configurations. Similarly, although specific methods have been described, any number of other types of methods might be performed in connection with embodiments described here.

The several embodiments described herein are solely for the purpose of illustration. Persons skilled in the art will recognize from this description other embodiments may be practiced with modifications and alterations limited only by the claims.

What is claimed is:

1. An apparatus, comprising:
  a biasing circuit configured to provide a bias voltage to a port of a communication interface, wherein the communication interface comprises a physical layer, the physical layer including the biasing circuit; and
  a logic unit included in the physical layer, the logic unit configured to enable and disable the biasing circuit based on a first signal received from a controller of the communication interface, wherein the controller is outside the physical layer, the logic unit further configured to enable and disable the biasing circuit based on a suspend signal received from the controller of the communication interface.

2. The apparatus of claim 1, wherein the first signal is to indicate whether data is available to transmit through a transmitter of the communication interface.

3. The apparatus of claim 2, wherein the port is the transmitter.

4. The apparatus of claim 3, wherein the logic unit is to enable the biasing circuit when the first signal indicates that data is available to transmit through the port.

5. The apparatus of claim 4, wherein the logic unit is to disable the biasing circuit when the first signal indicates that data is unavailable to transmit through the port.

6. The apparatus of claim 2, wherein the port is a receiver or differential envelope detector.

7. The apparatus of claim 6, wherein the logic unit is to enable the biasing circuit when the first signal indicates that data is unavailable to transmit.

8. The apparatus of claim 7, wherein the logic unit is to disable the biasing circuit after the biasing circuit has been enabled for a period.

9. The apparatus of claim 1, further comprising a charging circuit configured to provide a charging voltage to the port.

10. The apparatus of claim 9, wherein the logic unit to enable the charging circuit at the same time as enabling the biasing circuit and to disable the charging circuit when the voltage level of the port reaches a threshold.

11. The apparatus of claim 1, wherein the communication interface is part of either a host device communication interface or a peripheral device communication interface.

12. The apparatus of claim 1, wherein the controller is to send the suspend signal to the logic unit after receiving an indication from a device communicating through the communication interface to send the suspend signal.

13. The apparatus of claim 1, wherein the communication interface is part of a universal serial bus interface.

14. An apparatus, comprising:
an interface including a physical layer, wherein the interface comprises:
- a biasing circuit configured to provide a bias voltage to a transmitter port and a receiver port of the interface; and
- a logic unit included in the physical layer, the logic unit configured to enable and disable the biasing circuit based on a signal that indicates whether data is available to transmit through the transmitter port, wherein the signal is received from a controller of the interface and the controller is outside the physical layer.

15. The apparatus of claim 14, wherein the interface is a universal serial bus interface.

16. The apparatus of claim 14, wherein the interface is a device controller interface.

17. The apparatus of claim 14, wherein the interface is a host controller interface.

18. The apparatus of claim 14, further comprising a charging circuit configured to provide a charging voltage to the transmitter port and/or the receiver port.

19. The apparatus of claim 14, wherein the logic unit is to enable the biasing circuit to provide a voltage to the transmitter port when the signal indicates that data is available to transmit through the transmitter port.

20. The apparatus of claim 14, wherein the logic is to enable the biasing circuit to provide a voltage to the receiver port when the signal indicates that data is unavailable to transmit through the transmitter port.

21. A system, comprising:
a display port;
a module; and
a communication interface in communication with the module, the communication interface comprising:
- a controller configured to receive signals from the module; and
- a physical layer of a communication interface, the physical layer comprising:
  - a biasing circuit configured to provide a bias voltage to a port of the communication interface; and
  - a logic unit configured to enable and disable the biasing circuit based on a first signal received from the controller, wherein the controller is outside the physical layer, the logic unit further configured to enable and disable the biasing circuit based on a suspend signal received from the module through the controller.

22. The system of claim 21, wherein the controller is to assert the first signal when data is available from the circuit to transmit through a transmitter of the physical layer.

23. The system of claim 21, wherein the logic unit is to enable the biasing circuit to cause the biasing circuit to provide the bias voltage to the port when the controller asserts the first signal.

24. The system of claim 21, wherein the logic unit is to enable the biasing circuit to cause the biasing circuit to provide the bias voltage to the port when the controller asserts the first signal.

* * * * *